(12) United States Patent
Martinolich et al.

(10) Patent No.: US 7,178,162 B2
(45) Date of Patent: Feb. 13, 2007

(54) INCORPORATING GRAPHICS AND INTERACTIVE TRIGGERS IN A VIDEO STREAM

(75) Inventors: James Martinolich, Huntington, NY (US); James Altemose, Smithtown, NY (US); William Byrne, W. Sayville, NY (US); William D. Hendler, Northport, NY (US)

(73) Assignee: Chyron Corporation, Melville, NY (US)

( * ) Notice: Subject to any disclaimer, the term of this patent is extended or adjusted under 35 U.S.C. 154(b) by 1230 days.

(21) Appl. No.: 09/782,229

(22) Filed: Feb. 9, 2001

(65) Prior Publication Data
US 2003/0023971 A1   Jan. 30, 2003

Related U.S. Application Data

(60) Provisional application No. 60/181,461, filed on Feb. 10, 2000.

(51) Int. Cl.
*H04N 7/16* (2006.01)
(52) U.S. Cl. .................. 725/135; 725/32; 715/723; 715/726; 715/731
(58) Field of Classification Search .............. 725/32, 725/34, 36, 37, 135, 136; 715/723, 726, 715/731
See application file for complete search history.

(56) References Cited

U.S. PATENT DOCUMENTS 5,956,046 A * 9/1999 Kehlet et al. ............... 345/502
6,037,936 A * 3/2000 Ellenby et al. ............. 715/764
6,188,403 B1 * 2/2001 Sacerdoti et al. ........... 715/764

FOREIGN PATENT DOCUMENTS

WO   98 41013   9/1998
WO   98 53611   11/1998

OTHER PUBLICATIONS

The Chyron iNFINIT, Pub. No. 2A01976, pp. 1-978, Mar. 1999 Revision D.
The Advanced Television Enhancement Forum (ATVEF), Enhanced Content Specification, pp. 1-38 (1998, 1999).

* cited by examiner

*Primary Examiner*—Vivek Srivastava
(74) *Attorney, Agent, or Firm*—Lerner, David, Littenberg, Krumholz & Mentlik, LLP

(57) ABSTRACT

Triggers for interactive television display are incorporated into a video stream in coordination with graphics associated with the triggers. Graphic sources such as channels (16,18) of a character generator (21) supply graphics associated with the triggers to graphic signal inputs (26,28) of a switch. When a channel supplies a graphic, a message denoting the associated trigger and associating the trigger with the channel is forwarded to a gateway computer (60). The gateway computer monitors connections between graphic signal inputs (26,28) and the video output (32) of the switch, and forwards triggers associated with a particular channel to an inserter (40) only if such channel is connected to output (32).

16 Claims, 4 Drawing Sheets

INCORPORATING GRAPHICS AND INTERACTIVE TRIGGERS IN A VIDEO STREAM

CROSS-REFERENCE TO RELATED APPLICATIONS

The present application claims benefit of U.S. provisional patent application 60/181,461 filed Feb. 10, 2000.

BACKGROUND OF THE INVENTION

The present invention relates to production of interactive video.

Interactive television systems allow the viewer to interact with the program. For example, an interactive broadcast of a sporting event may allow the user to retrieve additional information about a particular player or to participate in an interactive game related to the sporting event. These actions are performed using a computer associated with the user's television set. Most typically, the computer is incorporated in a "set-top box." The interactive program stream includes conventional video signals which are displayed on the television set and also includes data specifying the actions to be performed by the user's computer in response to user input. For example, the video stream for a sporting event may include conventional video graphics indicating the name of a particular player together with a picture of the player. The program-defining data is provided in a form commonly referred to as an "interactive trigger" according to a standard protocol. The interactive triggers may include a uniform resource locator or "URL" identifying a web page or other content available on the Internet; and data identifying a script and providing parameters for the script including coordinate data specifying a "hot spot" or portion of the television screen and actions to be taken when the viewer positions a cursor on the hot spot and provides input such as a mouse or remote control click. In the example of a sporting event, the hot spot may be defined as the area of the screen encompassing the player's name as displayed by the conventional video graphics and the URL, script and parameters may be selected so that when the user clicks on this hot spot, the user's computer will retrieve additional information about the player from the page designated by the URL and will display that information on the screen along with the conventional video.

The interactive triggers must be coordinated with the conventional video graphics. For example, if the video graphics are displaying the name of player "John Jones" in the lower left corner of the screen during one portion of the program, the triggers supplied to the viewer's unit should define the hot spot in the lower left corner of the screen and should instruct the user's unit to access data about John Jones in response to a click on the hot spot. If the video graphics displayed at another time in the program display the name of player "Sam Smith" in the upper right hand portion of the screen, the trigger supplied during that portion of the program should instruct the viewer's unit to define a hot spot in the upper right corner of the screen and should instruct the viewer's unit to retrieve data about player Sam Smith in response to a click on that hot spot.

The interactive video stream includes two separate components: the video graphics data which defines an image viewable on the television set and the interactive triggers which are intelligible to the computer in the viewer's unit. The triggers and video graphics data are supplied in a data stream according to a standard protocol corresponding to the protocol used by the viewer's unit. One such protocol is described in the enhanced content specification published by the Advanced Television Enhancement Forum and commonly referred to as the "ATVEF" specification, published by ATVEF Licensing LLC of El Dorado Springs, Colo., USA, the disclosure of which is hereby incorporated by reference herein. For example, in one format according to the ATVEF Specification, triggers can be carried in triggers can be carried as teletext characters during the vertical blanking interval of an NTSC (conventional United States television signal) video stream.

Production of interactive television programs has required considerable effort heretofore to incorporate the appropriate triggers into the video stream. Moreover, the procedures for incorporating triggers have not been suited to normal television production practice. A typical video production facility includes numerous sources of video graphics as, for example, video feeds from numerous cameras capturing live action, one or more tape or disc players, and one or more character generators. One example of such a character generator is sold under the registered trademark iNFiNiT! by the Chyron Corporation of Melville, N.Y., the assignee of the present application, and is described in publications such as the iNFiNiT! Family Operation Manual, Chyron Pub. No. 2A01976, Rev. D, March 1999, the disclosure of which is hereby incorporated by reference herein. Such character generators are well-known in the art. Each character generator typically has one or more graphic supply channels. The character generator can retrieve a computer file and generate a video signal incorporating a graphic element as specified in the file. For example, the graphic data in the file may include text and data specifying the format of the text as, for example, the type face and size as well as template data specifying a region of the video screen to be occupied by the text.

Typically, all of the various graphic sources in the production facility are linked to input ports of a video switch. The video switch also has an output port. The video switch can be manually or automatically operated to select a set of graphic sources and incorporate the video graphic signals from the various sources into the output signal. In a live broadcast environment, a human director actuates the video switch to display the most appropriate graphics. For example, while broadcasting a sporting event, where players Smith and Jones are on the field, the director may actuate the switch to display output from one or more of the cameras covering the action. During this time, the character generator may be "cued" to generate graphics with the name of player Smith on one channel and the name of player Jones on the other channel, but these graphics are not included in the output signal from the switch. When player Jones scores a goal, the human director may decide to add the graphics showing his name superimposed on the image captured by the camera. The director does this by actuating the switch to add the graphics supply channel displaying that graphic to the set of video graphics included in the output signal. On the other hand, if player Smith scores a goal, the director actuates the switch to include the graphics supply channel carrying the graphic with player Smith's name. These procedures are widely used in television production. However, these procedures do not lend themselves to incorporation of interactive triggers in the output signal. Indeed, early attempts to include interactive triggers in a live broadcast have required a human operator to watch the output signal to deduce what graphic is being displayed and actuate a computer storing various triggers to forward the correct trigger to an device known as an "inserter" linked to the output port of the switch so that the inserter will insert the triggers into the output signal at the correct time. This requires an additional operator and, of course, introduces opportunities for errors.

Thus, despite all of the efforts in the art toward development of interactive television, there has remained a need heretofore for improvement in the apparatus and methods used to embed interactive triggers in a video stream. In particular, there have been needs for apparatus and methods which are compatible with conventional broadcast industry practices and which can incorporate the appropriate triggers into the video streams without significant additional effort on the part of the operator during the production session.

SUMMARY OF THE INVENTION

One aspect of the invention provides apparatus for encoding an output video stream with interactive triggers. Apparatus according to this aspect of the invention desirably includes a plurality of video graphic sources which can be operated to supply a plurality of video graphic signals. The apparatus also includes a video switch having an output connection and desirably having input connections connected to the various video graphic sources. The video switch is arranged to select a set of one or more of these video graphic sources and to operatively connect the set of selected video graphic sources to the output connection, so that the video graphic signals supplied by the one or more graphic sources in the selected set will be included in an output video stream at the output video connection. Thus, these graphics will be visible when the output video stream is viewed in a video receiver. The apparatus also includes an inserter having a trigger input. The inserter is connected to the video switch so that interactive triggers supplied to the trigger input will be inserted into the output video stream. A trigger source is provided for supplying data which specifies interactive triggers so that each such trigger is associated with one or more of the graphic sources. A gateway circuit is connected to the video switch so that the gateway circuit receives information from the video switch representing the identity of the set of graphic sources connected to the output channel. The gateway circuit is operative to automatically supply one or more triggers associated with one or more graphic sources in this set to the trigger input of the inserter. Thus, when the switch is actuated to display a graphic from a particular source, the correct trigger is automatically inserted into the output stream.

In a particularly preferred embodiment, the graphic sources include one or more sources such as one or more character generators which are arranged to retrieve a file or other specification unit containing both graphic data specifying one or more graphics and trigger data specifying one or more triggers. Each graphic source of this type is arranged to supply the graphic specified by the graphic data in the retrieved file or other specification unit to one of the inputs of the video switch and preferably is arranged to supply the data specifying the triggers called for by the retrieved specification unit to the gateway circuit. Thus, these graphic sources also serve as part of the trigger source. For example, a character generator may be arranged to supply trigger data included in a specification unit when the character generator is actuated to start supplying the graphic specified by that particular specification unit. However, the gateway circuit will only supply the trigger to the inserter if the graphic is incorporated into the output video stream by the switch. Using the example of the sporting event broadcast discussed above, a first graphic source such as a first channel of a character generator may supply the graphic with the name of player Smith and trigger data appropriate to that graphic, whereas a second graphic source such as a second character generator or a second channel on the same character generator may supply a graphic to display the name of player Jones and a trigger appropriate to that graphic. Neither trigger is included in the output video stream until the director actuates the switch to connect one or the other of these graphic channels to the output port and thus display one or the other graphic. If the director actuates the switch to display the graphic from the particular source displaying the name of player Smith, the gateway circuit will pass the trigger associated with that graphic source to the inserter and that trigger will be incorporated into the video stream. During production of the broadcast, the character and switch can be operated using the customary practice in the broadcast industry; neither the character generator operator nor the director operating the switch needs to take any additional action during the broadcast to assure proper trigger insertion.

In a particularly preferred arrangement, the graphic data in at least some of the specification units includes template data specifying a location such as screen coordinates of a graphic within the video image and the trigger data in at least some of the specification units includes either the template data itself or an instruction to incorporate the template data into a trigger. Alternatively or additionally, the trigger data may include data such as a URL identifying a base HTML document or other information source and data identifying actions to be taken in response to viewer input as, for example, a script and parameters to be executed using information in the data source. In a particularly preferred arrangement, the character generator or other graphic source is arranged to send a message to the gateway circuit incorporating the template data and instructions to include the template data in a trigger. Thus, if the operator of the graphic source decides to alter the template data as, for example, to change the size of a text message or to relocate the text message on the screen, the trigger will automatically be adjusted so as to cause the viewer unit to define a hot spot in or adjacent to the area occupied by the relocated graphic. The character generator operator need not take account of this during operation of the system.

A further aspect of the invention includes methods of providing a video output with interactive triggers. A method according to this aspect of the invention desirably includes the step of providing a plurality of graphics through a plurality of graphic sources and providing trigger data specifying a plurality of interactive triggers so that the data specifying each such trigger is associated with one of the graphic sources and thereby associated with the graphics supplied by that source. The method desirably further includes the step of selecting the set including one or more of the graphic sources and incorporating the graphics supplied by the selected graphic sources into an output video screen. The method desirably also includes the step of automatically selecting from the trigger data a set of selected trigger data associated with the set of graphic sources in response to selection of the graphic sources in the previously mentioned step and inserting the trigger specified by the selected trigger data in the output video screen. Thus, the trigger associated with each graphic will be inserted in the output video screen in a predetermined time relationship with that graphic as, for example, simultaneously with the graphic or slightly in advance of the graphic. The method desirably includes the further step of varying the step of graphic sources selected for inclusion in the output screen and varying the set of selected trigger data in response to the varying set of graphic sources. The step of providing the graphics and the trigger data desirably includes operating at least one graphic source to retrieve a specification unit such as a file or other unit of data incorporating graphic data specifying one or more graphics and trigger data specifying one or more triggers. The graphic source desirably is actuated to supply the graphics specified in the specification unit and to supply the trigger data included in the specification unit. Methods according to this aspect of the invention provide advantages similar to those discussed above in connection with the apparatus.

Yet another aspect of the invention includes a method of providing a trigger to be associated with a graphic in a video stream. A method according to this aspect of the invention includes the step of providing graphic data specifying a graphic to be displayed. The graphic data includes template data specifying a graphic region of the video screen to be occupied by the displayed graphic, this template data being in a form intelligible to a video graphic generator. The method includes the further step of automatically deriving from the template data an interactive trigger specifying a hot spot responsive to a cursor activity in a hot spot region having a predetermined spatial relationship to the graphic region. The method according to this aspect of the invention may further comprise the step of operating a graphic generator to generate the graphic specified by the graphic data and incorporating the graphic into an output video stream. The step of automatically deriving the trigger may be performed in response to the step of operating the graphic generator. Here again, because the trigger is derived at run-time, as, for example, during a broadcasting or recording session, the trigger will automatically be generated from up to date template data. If the operator alters the template data to change the size or location of the graphic, the hot spot region specified by the trigger will also be altered appropriately so as to maintain the relationship between the hot spot and the display graphic. In the most common application, the trigger data defines a box surrounding the region specified by the template data or a button at a location on the screen adjacent to the area specified by the template data.

These and other objects, features and advantages of the present invention will be more readily apparent from the detailed description of the preferred embodiments set forth below, taken in conjunction with the accompanying drawings.

DETAILED DESCRIPTION

Figure 1:
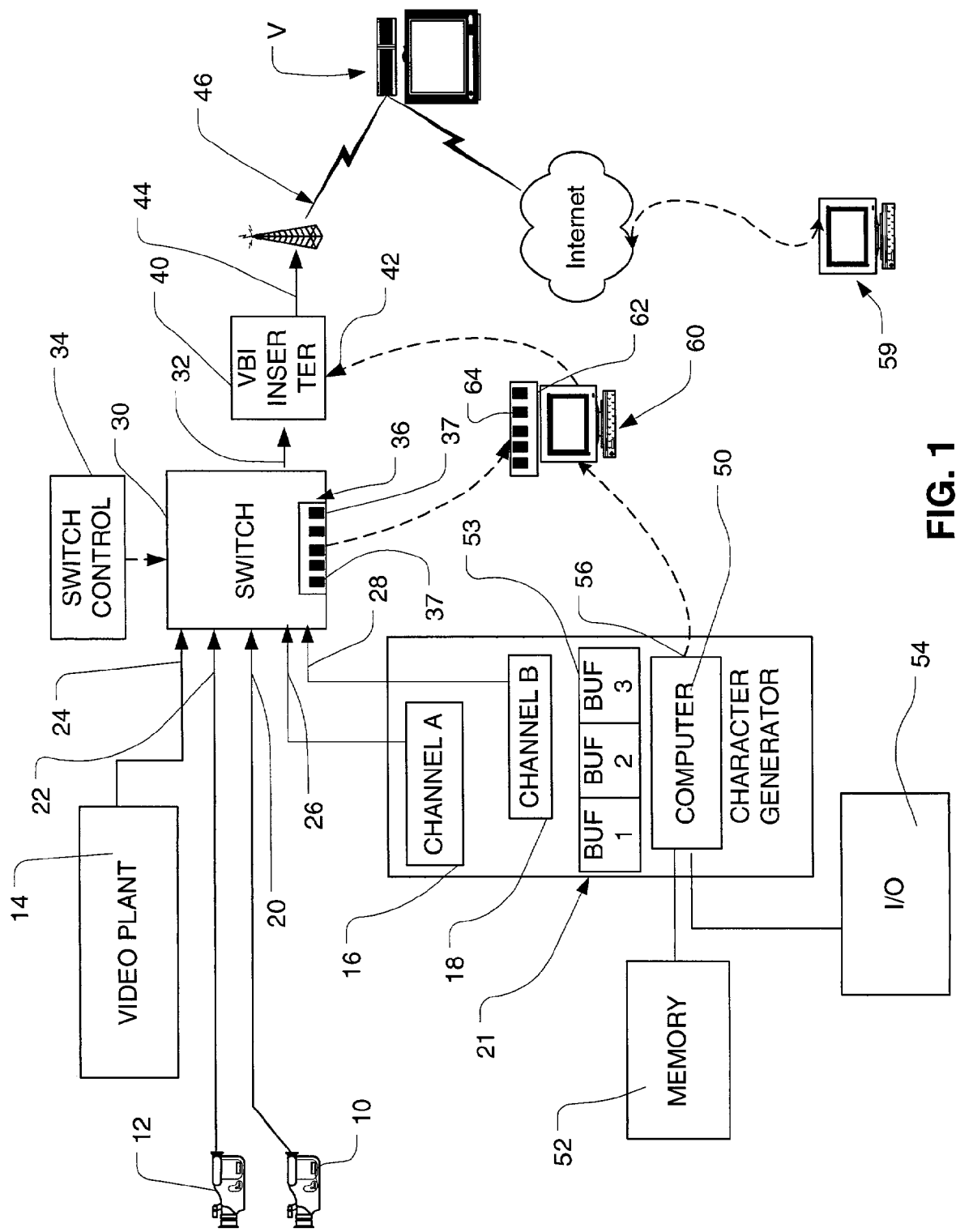
FIG. 1 is a diagrammatic view depicting apparatus in accordance with one embodiment of the invention in conjunction with broadcast and receiving apparatus.

Apparatus in accordance with one embodiment of the invention includes a plurality of graphic sources capable of providing streams of video graphic data. These graphic sources may include any conventional devices for providing the video graphic data in essentially any format. The particular graphic sources illustrated include cameras 10 and 12 as well as conventional video plant equipment 14 which may include devices such as tape or disc playback units, computer video generation sources and devices for processing video graphic signals in conventional ways, as, for example, devices for mixing and storing video signals or the like. The video plant equipment may be connected to receive inputs from other cameras (not shown).

The video sources also include two channels 16 and 18 of a character generator 21, discussed further below. In the particular embodiment illustrated, each of video sources 10 through 18 is arranged to provide graphics data in a conventional NTSC analog format. The video graphic signal outputs of sources 10–18 are connected to input connections 20–28 of a video switch 30. Thus, each graphic source is associated with one input of switch 30. Source 10 s associated with input 20; source 14 is associated with input 24 and so on. Switch 30 also has an output connection 32 and a control source 34. In the particular embodiment illustrated, the switch control source 34 is a manual keyboard or other manual input device. The switch and control source are arranged to allow selection of a set including any one or more of inputs 20–28 and to connect the inputs in the selected set to output connection 32. Because each graphic source 10–18 is associated with one input 20–28, selection of a set of inputs also selects a corresponding set of graphic sources and connects the graphic sources to output connection 32 so that the selected graphic sources will be incorporated into a video graphics screen at the output connection 32. In the particular embodiment illustrated, the video graphics screen at output 32 would be a standard NTSC baseband video signal.

Switch 30 also has a condition output interface 36. The switch is arranged to provide signals on the condition output interface indicating which inputs are connected to the video output 32 at any given time. In the particular embodiment illustrated, the condition output 36 is arranged to provide this information in a format commonly referred to in the video industry as a "general purpose interface" or "GPI" format. According to this format, condition output 36 includes a separate condition terminal 37 associated with each one of the graphic signal inputs 20–28. The voltage appearing at a particular condition terminal will be either high (+5V) or low (−5V) depending upon whether the graphic signal input associated with that condition terminal is or is not connected to video output 32. The relationship between high and low signals and connection or disconnection of a particular input can be either "active high" so that the condition terminal bears a high (+5V) signal when the associated input is connected to output 32 or "active low" so that the condition terminal bears a low (−5V) signal when the input terminal is connected to the output. The "active high" or "active low" scheme is set by the technician during setup of the switch. One example of a switch which can be utilized in the arrangement of FIG. 1 is the switch sold under the designation Model 4000 by the Grass Valley Group company of Nevada City, Calif.

The video output connection 32 of switch 30 is connected to the video input of a vertical blanking interval ("VBI") inserter 40. VBI inserter 40 also has a data input 42 and a video output 44. The VBI inserter is arranged to receive data in digital form, as, for example, as conventional ASCII data and to insert the received data into a portion of the video signal during the vertical blanking interval as, for example, on that portion of the signal corresponding to VBT line 21 using the "T-2" service as specified in Electronics Industries Association ("EIA") specification EIA-608. As discussed below, ATVEF-format triggers will be included in the data. The incorporation of this data into the signal is consistent with EIA specification EIA-746A. However, as specified in the ATVEF Specification, the character set used in encoding the triggers is according to ISO 8859-1 rather than the EIA-608 character set. Suitable VBI inserters are commercially available; one suitable device is sold under the designation TES3 by the Norpak company of Kanata, Ontario, Canada.

The video signal output 44 of the VBI inserter 40 is provided to a conventional video signal distribution system 46. The video signal distribution system may include a conventional on-air or cable video broadcast system or network, or any another device or set of devices capable of carrying standard video signals. Merely by way of example, the video distribution system may include storage elements such as video tapes or discs and playback devices either at a broadcast studio or at a viewer's location as, for example, conventional home videotape or disc units so that the signal may be retrieved and viewed at a time after it is provided at video signal output 44.

Character generator 21 includes a conventional computer 50 and associated mass storage memory 52 such as conventional disc memory, as well as conventional input/output devices 54 such as a keyboard, mouse and display screen. As mentioned above, the character generator also includes one or more output channels 16 and 18. Each output channel has an internal designation within the character generator, as for example, "channel A" or "channel B". The character generator further includes several frame buffers 53, each having an internal designation within the character generator as, for example, "frame buffer 1". Computer 50 is arranged, in the conventional manner to retrieve graphics data files, commonly referred to as "pages" designating graphics to be displayed. Typically, each graphics data file or page designates one or more regions of the video screen to be occupied by one or more displayed graphic elements and also designates the graphic material to appear within each such region. Each such region is referred to as a "tab" or "template", and the portion of a graphic data file which defines each graphic region is also referred to as a "tab" or "template". The size and shape of a graphic region may be defined by coordinate data in the tab specifying the beginning points of a rectangle in the horizontal and vertical directions, and also specifying the height and width of the rectangle. Because a video image may be displayed on a screen of any size, the coordinate data commonly are given in units of measure relative to the full screen dimension such as a percentage of full screen or other equivalent unit such as scanning lines (for vertical dimensions) and pixels (for horizontal dimensions). The data defining the graphic to be displayed within the region may incorporate any data which can be converted into a bit map or other equivalent representation of a graphic image. In a simple arrangement, the graphic data may include data defining a background color for the region and data such as ASCII data defining a character string as well as data designating character size, color and font to be used when the characters are displayed. As is well known in the art, the graphic data employed by a character generator may include more elaborate information such as information defining moving or otherwise changing characters, and characters or regions to be filled with video information from another source connected to the character generator. The graphic data may also include transparency data defining the transparency of the displayed graphic. In the conventional manner, the transparency data specifies what will occur if the displayed graphic overlies another image at the same point on the video screen. A highly transparent image will allow the other image to show through, whereas an opaque image will not.

In well-known manner, the pages or graphic data files may be compiled by the character generator itself in response to information entered by a human operator through input/output devices 54, or else may be provided from an external source. When the graphic data file or page is retrieved, the computer composes the graphics defined by the graphic data into a bit map or other equivalent representation of a screen image which is held in one or more of the frame buffers 53. Each channel 16 and 18 is arranged to convert the bit map or other equivalent representation of a video image in one or more buffers into a standard video signal as, for example, an NTSC baseband video signal and to supply that signal continually until it is instructed to change the signal as, for example, when a new bit map is supplied or when the computer instructs the channel to stop displaying any signal. Thus, each channel includes appropriate conventional circuits for converting the bit map held in the frame buffer or buffers into the desired conventional video signal. The association between particular channels and particular buffers can be changed through computer 50. The computer 50 of the character generator also has an external data communications link such as a conventional Etnernet port 56 for sending and receiving messages according to a conventional data communications protocol as, for example, the Telnet protocol. All of the foregoing features of the character generator are conventional and known in the art. Particular features such as the operating system used by the computer and the protocols and data formats used to denote particular items of information would depend upon the particular character generator employed. One family of character generators suitable for use in the arrangement of FIG. 1 is sold by Chyron Corporation of Melville, N.Y., the assignee of the present application under the trademarks iNFiNiT!, MAX and MAXINE. These and other character generators, and their internal structures, as well as the programming techniques and conventions used in the operating systems are well known and widely used in the television art. The features of the iNFiNiT!, MAX AND MAXINE of these particular character generators are further described in the aforementioned publication. Still other publications describing these particular character generators are available on the Internet at http://www.chyrongraphics.com/publications/manuals_b.html.

Figure 2:
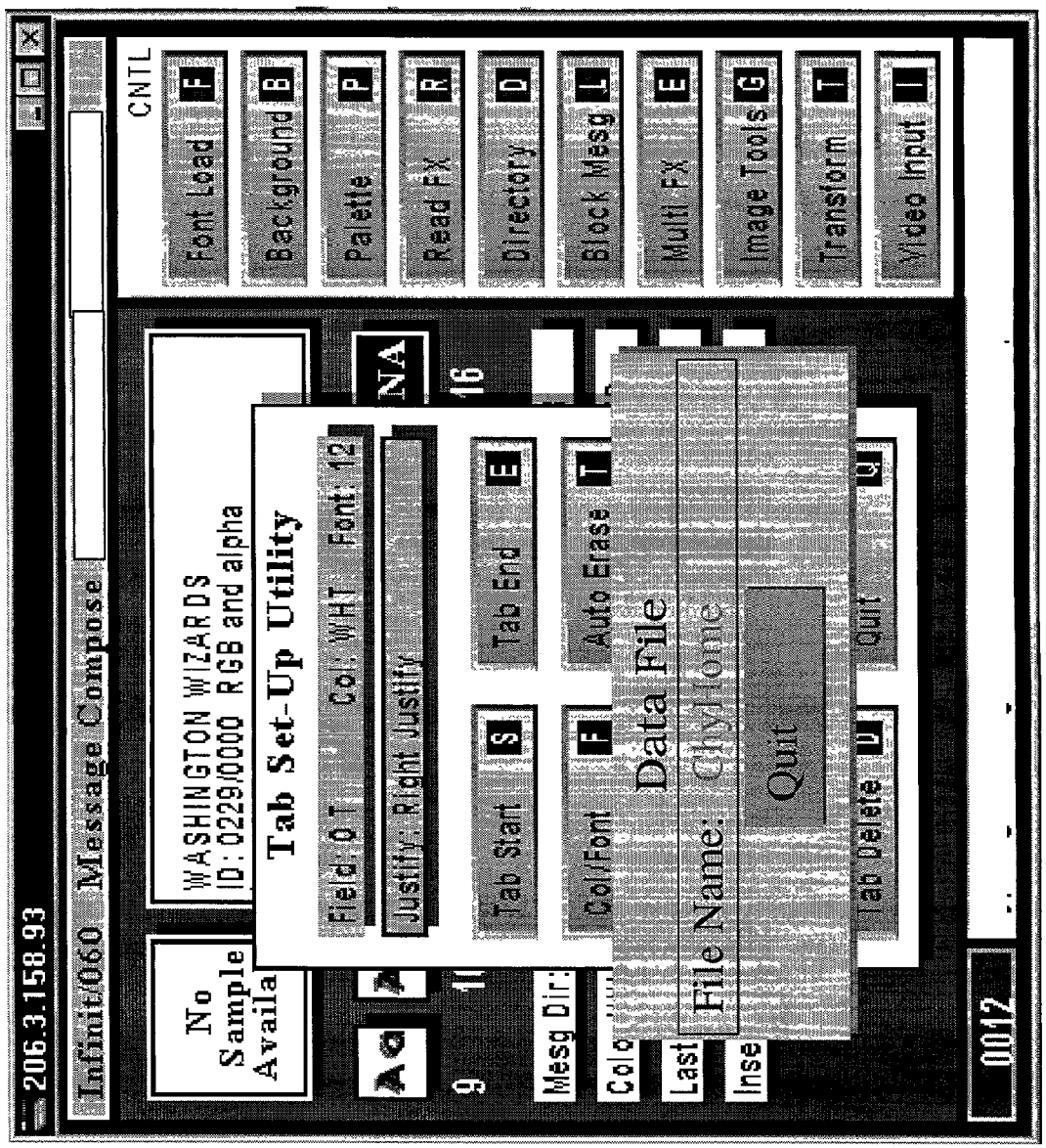
FIG. 2 is a view depicting a message display during a setup operation using the apparatus of FIG. 1.

In the embodiment of the present invention shown in FIG. 1, the file structure and computer program employed by the character generator are altered so that trigger data specifying one or more interactive triggers is associated with the graphics data defining a graphic region or regions and will be retrieved by the computer when the page or graphic data file is retrieved. Thus, the trigger data and the graphics data are associated in a single unit, referred to herein as a "specification unit". Such a specification unit can be formed by writing the trigger data directly into the same file as the graphics data. Preferably, however, the trigger data is provided as one or more separate files and the designation of the trigger data file is recorded in the graphics data file. Where the graphics data file or page defines several graphics regions or tabs, separate file designations are provided in each tab which is to be associated with a trigger. The file designation is recorded in a format which will be recognized by the computer as a designation for a trigger file. In certain cases, a page will include graphics information designating several graphic regions or tabs so that numerous graphics will appear in separate regions of the screen when the page is recalled and played, but only one or a few regions will have triggers associated with them. The association between the graphics data for a particular tab and a trigger data file can be established as part of the process used to record the graphics data for the tab. For example, the aforementioned INFINIT! character generator uses a program called "Message Compose" to allow the operator of the system to record graphics data files or pages. This program displays a graphical user interface on the screen incorporated in input/output unit 54. A "tab setup utility" is provided as part of the conventional options available in this program. That portion of the program defining the tab setup utility defines an interface with various user-selectable options. By invoking various options offered by the interface, the operator can cause the program to record or edit graphics data for a particular tab. The interface is provided with an additional option for trigger file identification. Thus, in response to a particular input from the operator during use of the tab setup utility program, the computer asks the operator to specify the identity of the trigger data file. For example, the tab setup utility menu can be provided with an entry marked "one". If the operator selects that entry, the dialog box illustrated in FIG. 2 is displayed. The computer recognizes data entered in that dialog box as data denoting the trigger data file. That data is recorded as part of the entry in the graphics data file defining the particular graphic region or tab. The tab set up utility may also include an option for deleting the trigger file identifier from the graphics data file.

Each trigger data file includes data sufficient to specify the trigger according to the ATVEF specification, and may also include a header for file format definition. A trigger is simply a set of characters in the ISO-8859-1 character set (also referred to as "Latin-1" and US-ASCII) which begins with a URL enclosed in angle brackets (e.g. <http://jones.com/page.html>). The URL may or may not be followed by one or more of the following items referred to as "attribute-value pairs":

[name:string] (e.g.[name:myname]) In this expression, the string ("myname") represents a human-readable name of the enhancement which will be executed in response to the trigger.

[expires: time] The expression "time" represents an expiration date and (optionally the time of day) in accordance with the ISO-8601 standard , and indicates that the trigger is no longer valid after the indicated date or time.

[script:string] The string in this expression represents an ECMAScript fragment, i.e., a script executable under Java-Script 1.1 (e.g.[script:myscript()]).

As further explained below, the HTML document designated by the URL will be loaded into the viewer's unit in response to the trigger containing the URL. The script is executed within the context of that document. That is, while the particular document represented by the URL is loaded in the viewer's unit, the unit loaded with said document will respond to an instruction to execute the script by performing particular actions specified in the document. The parenthetical expression following after the identification of the script as, for example, the parenthetical following the word "myscript" in the foregoing example, represents parameters (if any) to be used in execution of the script. The particular parameters which are incorporated in the string defining the script in the trigger will depend upon the script and upon nature of the action to be performed in execution of the script. One common action is for the viewer's unit to display an active area or "hot spot" on the screen, to outline the active area with a visible indication such as a line of contrasting color, and to respond to a mouse click, remote control actuation or other action by the user while the screen-displayed cursor is in the active area by executing some further action. For example, the script may call for the viewer's unit to display information contained in the HTML document in response to such a mouse click with the cursor positioned in the hot spot. The parameters for such a script may include the coordinates of the hot spot.

The data specifying the trigger incorporated in the trigger data file may be simply a copy of the trigger itself. Preferably, however, the data specifying the trigger is presented in a predetermined format which is subsequently converted into a trigger. As previously mentioned, it is often desirable to display a hot spot as an outline surrounding a graphic area. The trigger-specifying data desirably is stored in a format without the coordinate data for the hot spot. When the graphic-specifying data and the trigger specifying data are read during playback of the graphic by the character generator, the hot spot coordinate data can be filled in with the data derived from the coordinate data defining the graphic area as further discussed below. Thus, the trigger-specifying data may include markers specifying where the coordinate data for a hot spot are to be inserted. The particular format is for data specifying a trigger in a system using the INFINIT! character generator is as follows:

```
DATAFT<space><space>WCHY Base Page
<ITV>
<URL>http://www.chyron.com/wchy/bp.html</URL>
<NAME>The WCHY Chyron Hour</NAME>
<SCRIPT>s (%N,%X,%Y,%W,%H) </SCRIPT>
</ITV>
```

In this format the first line includes a file type identifier constituting the first eight characters of the file ("DATAFT <space> <space>") identifying the file as a trigger data file to be exported, followed by a name ("WCHY base page") which offers a text description of what is in the file. This text description will be retrieved and displayed during directory and file listing functions of the system. When the identifier DATAFT <space> <space> is provided, the contents of the file are exported as part of a tagged message during playback as discussed below. An alternative file identifier ("DAT-ARAW <space>") identifies a data file which is exported as raw, binary data.

The matter between the tags <ITV> and </ITV> represents matter which would be part of the trigger itself. For example, the expression following the tag <script> represents the string which will be included in the script attribute-value of the trigger. In the parenthetical expression of script S, parameters are represented by expressions which denote macros. As discussed below, these macros are executed during playback so that the parameters of the script are filled in with data derived from the graphic data filed. The matter between the tags <URL> and </URL> is the uniform resource locator for a web page to be retrieved and loaded by the viewer's equipment in response to the trigger. Web pages referred to in the URL specified by a trigger data file may be at any location on the internet, or at any other location which is accessible to the viewer's equipment in response to a URL. Typically, the web pages which are directly referred to in the URL's contained in trigger data files are composed for an individual program or type of program. The server 59 which holds such web pages commonly is referred as a "enhancement server".

During operation, when character generator 21 is actuated to retrieve a particular graphics data file or page, and to display the graphics specified in that file through one channel 16 or 18, it broadcasts a message using the Telnet protocol through data output 56. That message is in an XML format. The tags employed in the message correspond to a document type definition referred to herein as Broadcast Medium Markup Language or "BMML". The designations Broadcast Medium Markup Language and BMML are trademarks of Chyron Corporation.

In accordance with normal XML practice, the various data elements are referred to as "fragments". Each fragment is denoted by a "tag" which precedes the data within the fragment, and which includes a name identifying the fragment. The tag itself may include "attributes" or statements which include data. Also in accordance with XML practice, the end of a fragment is denoted by a tag with the fragment name preceded by a slash character (/). In some cases, a fragment may consist only of a single tag so that the tag begins and ends the fragment; such a tag is referred to as "self-terminating". The term "sub-tag" refers to a tag which can be included within the fragment specified by another tag. In accordance with normal XML practice, the various data elements are referred to as "fragments". Each fragment is denoted by a "tag" which precedes the data within the fragment, and which includes a name identifying the fragment. The tag itself may include "attributes" or statements which include data. Also in accordance with XML practice, the end of a fragment is denoted by a tag with the fragment name preceded by a slash character (/). In some cases, a fragment may consist only of a single tag so that the tag begins and ends the fragment; such a tag is referred to as "self-terminating". The term "sub-tag" refers to a tag which can be included within the fragment specified by another tag.

A <BMML> tag the beginning of BMML fragment in the message, and states as an attribute the version of the BMML document type definition under which the BMML section was composed. This tag must be issued at the start of each BMML fragment. For example:

<BMML Version="1.0">

Valid fragments within a <BMML> fragment include: <PAGE> and <MIXER>.

The information in the <MIXER> BMML fragment specifies the frame buffer and channel assignments for the character generator. The only valid fragments within the <MIXER> fragment are one or more <CHANNEL> tags. <CHANNEL> is a self terminating tag with the following attributes:

ID—Mandatory attribute specifying the video output channel. For iNFiNiT!, MAX and MAXINE character generators, the channel is specified by a letter (typically A, B or P) for other character generators, integers (1 . . . n) are used.

FrameBuffer—Mandatory attribute specifying frame buffer numbered 1 . . . n.

Percentage—Optional attribute specifying blending percentage, i.e., the degree to which the video signal output through the channel identified in the ID attribute depends on the contents of the specified frame buffer.

For example, the following MIXER fragment indicates that the graphic information passed through frame buffer 2 of the character generator forms the video signal on channel A (16, FIG. 1) whereas graphic information passed through frame buffer 1 forms the video signal on channel B (18, FIG. 2) and that the preview channel P is idle.

```
<MIXER>
    <CHANNEL ID="A" FrameBuffer="2" Percent="100"  />
    <CHANNEL      ID="B"      FrameBuffer="1"       />
    <CHANNEL      ID="P"      FrameBuffer=""        />
</MIXER>
```

The <PAGE> BMML fragment is issued whenever a "page" or graphics data file is retrieved by the character generator. The <PAGE> tag which begins a <PAGE> fragment includes a "Message" attribute and a "FrameBuffer" attribute as, for example:

<PAGE Message="C/WCHY/MESSAGE/0.1234"
      FrameBuffer="1">

The Message attribute specifies the identity of the graphics data file which has been retrieved and which will be displayed, i.e., the document path of the graphics data file or "page" within the memory structure of the character generator in the form of "drive-letter/directory/filename". If the Message attribute is missing or refers to an empty value, this indicates that the graphics data file or page is no longer being displayed. In this case, the <PAGE> tag is self-terminating.

The FrameBuffer attribute specifies the frame buffer within the character generator being used for the graphics data from the graphics data file or page. In conjunction with the association between frame buffers and output channels set forth in the <MIXER> fragment discussed above, the information in the FrameBuffer attribute fully specifies the output channel of the character generator which is carrying a video signal with graphics specified in the particular graphics data file or "page". Thus, in the <PAGE> tag:

<PAGE Message="C/WCHY/MESSAGE/0.1234"
      FrameBuffer="1"> the FrameBuffer attribute indicates that the graphic information specified by the page are being routed to frame buffer 1 of the character generator, whereas in the <MIXER> fragment shown in the example above, the FrameBuffer attribute of the <CHANNEL> tag:

```
<CHANNEL         ID="B"        FrameBuffer="1"       />
``` indicates that the information in frame buffer 1 of the character generator is incorporated in the video signal appearing on Channel B of the character generator. Taken together, this information indicates that the graphic specified by the page is appearing in the video signal on Channel B of the character generator.

A <PAGE> fragment which includes a valid Message attribute, and which thus indicates that a graphic data file or page is being displayed will include one or more <FIELD> fragments. A separate <FIELD> fragment is provided for each tab in the graphic data file or page which includes a reference to a trigger data file. The <FIELD> fragment for each tab or graphic region can include the following fragments:

<ID>—Identifies the particular tab by number within the page, i.e., 001 for the first tab of the page, 002 for the second tab of the same page, and so on.

<NAME> A name associated with the tab.

<COOR>—The screen-position coordinate data defining the boundaries of the graphic region on the screen. These are given in the order :x, y, dx, dy, where x and y are the coordinates of the starting point (the upper left-hand corner of a rectangular region) and dx and dy are the lengths of the horizontal and vertical sides of the rectangle. [inventor please check]

<ITV> Data defining an interactive trigger.

The data in the <ID>, <NAME> and <COOR> fragments is taken from the graphics data file or page. Thus, when the computer 50 of the character generator is composing the message, it copies this data from the graphic data file. If the graphics data file or page includes a reference to a trigger data file within the section defining a particular tab, the computer of the character generator copies the contents of the trigger data file (other than first line, which contains the file type identifier DATAFT and the descriptive name of the trigger data file) as the <ITV> fragment of the <FIELD> fragment for that tab.

Stated another way, <ITV> is a valid fragment within a <FIELD> fragment, and <ITV> is a valid subtag of the <FIELD> tag. <URL>; <NAME>; and <SCRIPT> are valid subtags of the <ITV> tag. In this regard, the <NAME> subtag of <ITV> is not redundant with the <NAME> subtag of <FIELD>; they will be processed differently in the computer which receives the message, as further discussed below.

BMML messages that include one or more <PAGE> tags should also include a <MIXER> tag statement. Preferably, the <MIXER> tag statement precedes the <PAGE> tag set.

The system further includes a gateway circuit 60. In the embodiment of FIG. 1, the gateway circuit is implemented as a general purpose computer such as a standard personal computer programmed to perform the functions discussed below. The gateway circuit or computer 60 has a interface 62 such as a standard computer input/output interface card having a plurality of sensing terminals 64. The interface card is arranged, in the normal manner, to monitor a voltage appearing at each terminal 64 and to report the status of each terminal, i.e., to report a "low" status for a particular terminal 64 if the voltage appearing at that terminal is −5V or to report a "high" status for that terminal if the voltage appearing at the particular terminal 64 is +5V. Interface 64 is connected to the condition output interface 36 of switch 30. Each sensing terminal 64 is connected to one condition terminal 37 of interface 36. Accordingly, the voltage appearing at each sensing terminal 64 will represent the status of one of the video graphics signal inputs 20–28 of the switch. The correlation between particular terminals 64 and video connections 20–28 is established when the system is connected. As mentioned above, a particular condition terminal 37 and hence the corresponding sensing terminal 64 may be at a high voltage when the associated video graphics signal input is connected to the video output 32 of the switch and at a low voltage when the particular video output is disconnected (an "active high" arrangements or the reverse ("active low"), depending upon the setup employed in switch 30.

Figure 3:
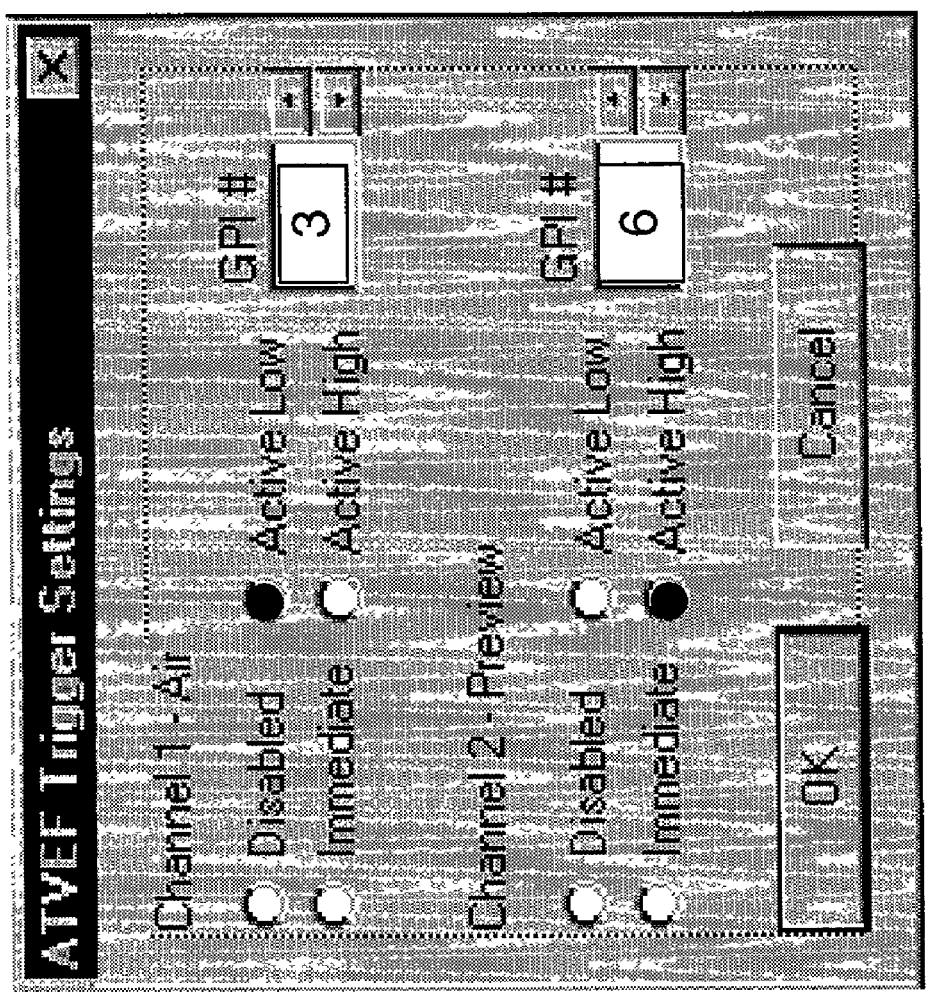
FIG. 3 is a depiction of another message display used in setting up the apparatus of FIG. 1.

During set up of gateway computer 60, the gateway computer runs an input program which allows the technician to supply correlations between particular video input channels and the identities of the graphic sources connected to those channels. Thus, the program displays an input screen as seen in FIG. 3 for each character generator connected to the system. In the example depicted in FIG. 3, channel A (also referred to as channel 1) of the character generator is connected to a particular video input associated with the #3 GPI condition interface terminal 37, whereas another channel of the same character generator is connected to a graphic signal input associated with #6 GPI condition interface terminal. The technician enters these numbers in the boxes provided by the input program and the computer program in gateway computer 60 records this information. The gateway computer program also allows the technician to enter information as to whether the connection for the particular graphic signal input is active high or active low. The program also allows for a "disabled" setting indicating that the channel of the character generator is inactive and should be disregarded and a "immediate" setting indicating that the channel of the character generator is always connected to the video output. Thus, at set-up the technician supplies the gateway computer 60 with all of the information required to compile a table associating each graphic supply channel 16, 18 of character generator 21 with a GPI condition interface terminal 37 of interface 36 and thus associate each graphic supply channel with a particular terminal of interface 64.

After set-up, during normal operation, gateway computer 60 continuously monitors the input from interface 62 and thus monitors the state of each graphic signal input 26, 28 connected to a character generator channel 16 or 18. The computer 60 thus continually determines whether or not the graphic signal input 26 connected to the video signal output of character generator channel 16 ("channel A") is connected to the video output of switch 32 and also determines whether or not the graphic signal input 28 connected to the video output of channel 18 ("channel B") is connected to the video output 32 of the switch. Stated another way, the gateway computer uses the condition data supplied by switch 30 to continually determine the set of graphic supply channels 16 or 18 which are connected to video output 32. That set may include channel 16, channel 18, both or neither.

Gateway computer 60 is connected through all standard Ethernet connection to the Ethernet port of the computer 50 in the character generator 21. The gateway computer is also connected to the trigger data input 42 of VBI inserter 40, as, for example, through an Ethernet connection.

During operation, while a program is being produced from the various video graphic signals supplied at inputs 20–24, character generator 21 is actuated in the conventional manner, either by manual control or by preprogrammed automatic control to retrieve graphics data files or pages from memory 52 and generate graphic signals. The graphics called for by each page of graphic data file are displayed in a video signal on channel 16 or channel 18 using one or more of frame buffers 53. If one the retrieved graphic data file or page includes one or more tabs which refer to one or more trigger data files, the computer of the character generator sends a BMML format message as discussed above under the BMML protocol through internet connection 56. The BMML message will include a separate <FIELD> fragment for each tab which includes a reference to a trigger data file. That message is received at gateway computer 60.

The gateway computer 60 identifies the message as having originated at character generator 21 based on the IP address of the sender included in the Telnet-protocol message. The gateway computer 60 translates the information in each <FIELD> fragment of each <FIELD> fragment into an ATVEF trigger. Thus, the string in the <URL> fragment of the <ITV> fragment within the <FIELD> fragment is copied as the URL in the ATVEF trigger. The information in the <NAME> fragment of the <NAME> fragment of the <ITV> fragment is copied as the string in the name attribute/value pair of the ATVEF trigger. The information in the <SCRIPT> fragment is copied as the script string in the script attribute/value pair of the trigger. However, the macro symbols discussed above are replaced by values found in other fragments within the same <FIELD> fragment. These replacements are as follows:

% N is replaced by the information appearing in the <NAME> fragment of the <FIELD> fragment (not the name fragment of the ITV fragment).

% X is replaced by the first value set forth in the COOR fragment of the field. As discussed above, that value is the X or horizontal starting position of the graphic region.

% Y is replaced by the second value in the COOR fragment, i.e., the vertical starting position of the graphic region.

% W is replaced by the third value in the COOR fragment, i.e., the horizontal width of the graphic region.

% H is replaced by the fourth value in the COOR fragment, i.e., the vertical height of the graphic region. Thus, the gateway computer derives parameters in the trigger from parameters included in the graphic data file. The gateway computer writes the trigger into a buffer referred to herein as a "trigger buffer" and stores information indicating that such trigger buffer is associated with frame buffer specified in the FrameBuffer attribute of the <PAGE> fragment which contains the <FIELD> fragment.

Based on the association between frame buffers and graphic supply channels provided by the <MIXER> fragment of the BMML message, gateway computer 60 establishes an association between the trigger buffer and an output channel 16 or 18 of the character generator. If the condition data provided through the switch GPI interface indicates that the signal input associated with that video channel is not connected to the video output 32 of the switch, the gateway computer does not forward the ATVEF trigger to the VBI inserter. Typically, the character generator will be actuated to retrieve a page, and begin providing a video signal including the graphics, at a time before the graphics are required in the output. At some later time, the human director manually operating the switch control 34 (or an automatic system performing the same function) decides to include that graphic as part of the output signal and actuates the switch to connect the character generator channel to output connection 32. At that time, the condition interface data received at interface 62 indicates that the graphic supply channel associated with the trigger buffer and with the trigger contained therein is included in the set of graphic sources connected to output 32. When this occurs, the gateway computer 60 forwards the trigger from the trigger buffer to the VBI inserter, and the VBI inserter inserts the trigger into the output signal, which passes through the distribution system 46.

The viewers equipment V (typically a set top box linked to a conventional television receiver) responds to the trigger. If the web page referred to by the URL has not already been loaded in the viewers equipment, the viewers equipment retrieves the web page from enhancement server 59 through the Internet. The viewer's equipment executes the script in the context of that page.

The following BMML message will be sent when channel B of the character generator is used to display a graphic named WCHY1 at coordinates 94, 394, 550, 50 in the graphic signal appearing on channel B using frame buffer 1 of the character generator:

```
<BMML Version="1.0">
<MIXER>
    <CHANNEL ID="A" FrameBuffer="2" Percent="100" />
    <CHANNEL ID="B" FrameBuffer="1" />
    <CHANNEL ID="P" FrameBuffer="" />
</MIXER>
<PAGE Message="C/WCHY/MESSAGE/.1234" FrameBuffer="1" >
    <FIELD>
        <ID>001</ID>
        <NAME>WCHY1</NAME>
        <COOR>94,394,550,50</COOR>
        <ITV>
            <URL>http://www.chyron.com/wchy/bp.html</URL>
            <NAME>The WCHY Chyron Hour</NAME>
            <SCRIPT>s(%N,%X,%Y,%W,%H)</SCRIPT>
        </ITV>
    </FIELD>
</PAGE>
</BMML>
```

In response to that message, gateway computer 60 will generate the following trigger:

<http://www.chyron.com/wchy/bp.html> [name: The WCHY Chyron Hour] [script:s("WCHY1", 94,394,550,50)]

The gateway computer will store that trigger in a trigger buffer associated with frame buffer 1 and with graphic supply channel B (18, FIG. 1) of the character generator. When the switch is actuated to connect with the input 28 associated with channel B (FIG. 1) to output 32, the video signal at output 32 will include the graphic. At that time, the gateway computer will forward the trigger to VBI inserter 40 and hence the video signal will carry the trigger.

Figure 5:
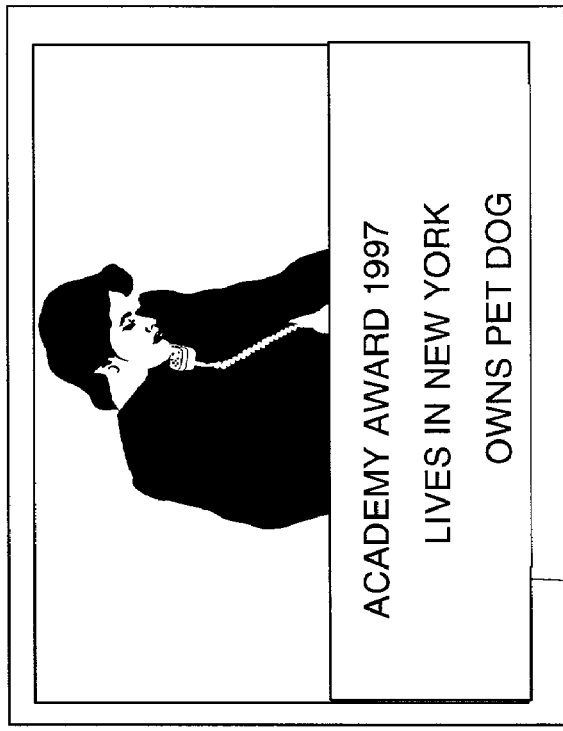
FIGS. 4 and 5 are pictures of a screen displays generated by viewer's equipment receiving a video stream from the apparatus of FIG. 1
Figure 4:
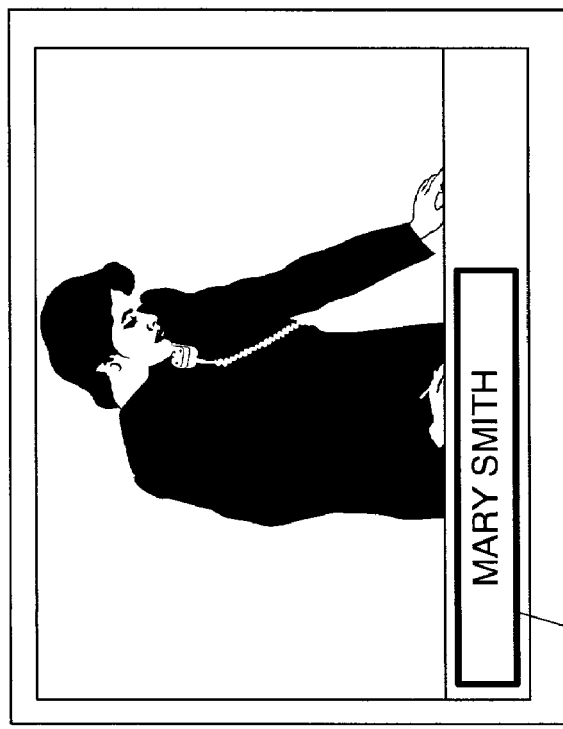

When the viewer's equipment V receives the video signal containing the graphic, it will show a conventional video picture (FIG. 4) which includes the graphic. The set top box of the viewer's equipment will also execute the trigger, resulting in execution of script s in the context of page http://www.chyron.com/wchy/bp.html. Execution of the script in this context will cause the viewer's equipment to define a hot spot in a box having the same starting point, height and width as the graphic, and to outline the hot spot in a contrasting color or brightness 80 (FIG. 4). If the viewer positions the cursor within the hot spot and provides input as, for example, a mouse click, the script will take the appropriate action as, for example, by displaying additional information 82 (FIG. 5). The script may vary the action taken in response to actuation depending upon the parameters in the script, i.e., one set of information may be displayed if the leading parameter is "WCHY1" as in the example, whereas other, different information may be displayed if the leading parameter is different. This allows the same script to be used with numerous graphics of different contents, where different additional information is appropriate.

Because the coordinates for the hot spot are derived from the coordinate data in the graphic file, the hot spot will always be aligned with the displayed graphic even if the coordinates of the graphic are changed. Also, because the leading or action-determining parameter of the script is derived from the graphic data file, the same script and indeed the same trigger data file can be used to provide many different actions.

If the character generator stops displaying the graphic, denoted by the previously displayed page, it sends a BMML message with a page tag having a blank (non-existent) message parameter and with the frame buffer parameter previously used for the displayed message. In the example above, the character generator would send the following BMML message when display of the graphics called for by the page is terminated as, for example, when the character generator executes an "erase" operation:

```
<BMML Version="1.0">
    <PAGE FrameBuffer="1" />
</BMML>.
```

In response to this BMML message, the gateway computer clears the trigger buffer associated with frame buffer 1 and stops forwarding that trigger to the VBI inserter.

Also, even if the character generator continues to display the graphic called for by the page, and does not send the blank page message, the director may actuate the switch to disconnect input 28 of the switch from the video output 32. In that case, the condition data received at interface 62 indicates to the computer that input 28, and hence channel B, are not connected to output 32. The gateway computer stops forwarding the trigger in the trigger buffer associated with channel B. If the channel is later reconnected to output 32 while the channel is still outputting the same page, the gateway computer resumes forwarding the trigger in the associated trigger buffer.

The system handles any number of graphic supply channels and any number of triggers in the same way. For example, a single page or graphics data file may include numerous tabs having numerous references to one or more trigger data files. In this case, the BMML message sent by the computer 50 of the character generator would include numerous field fragments and the gateway computer would compose numerous triggers which would be loaded sequentially in the same trigger buffer. Also, the character generator can retrieve two or more pages and supply a video signal incorporating the graphics called for by each page through a separate channel. In this case, separate BMML messages (or a single BMML message with multiple <PAGE> fragments) are generated for the separate pages and gateway computer 60 composes and stores the triggers called for in these messages in separate trigger buffers associated with the different channels. When the graphic signal input 26 or 28 associated with each channel is connected to the video output. 32 by switch 30, the gateway computer 60 will forward the trigger or trigger stored in the associated trigger buffer to the VBI inserter. If the signal inputs 26 and 28 associated with both channels are connected simultaneously to the video output, the gateway computer will forward the triggers in both buffers. Stated another way, the set of triggers forwarded to the VBI inserted by the gateway computer includes the set of triggers associated with the graphic signals supplied by the set of channels which are connected to the video output 32 at any given time.

Numerous variations and combinations of the features discussed above can be employed. For example, the system may include two or more independent character generators. In this case, the gateway computer identifies messages coming from each character generator based on the IP address of the character generator. Also, the interactive triggers can be incorporated into the video output signal in any output format. In the foregoing examples, the triggers are inserted in accordance with the ATVEF transport A standard, but standards such as ATVEF transport B, data encapsulation and MPEG Transport stream or other formats can be employed.

The file and message formats can be varied as desired. Any internally consistent messaging format recognizable by the gateway computer can be employed. Also, the particular way in which the trigger data is referenced in the page or graphic data file discussed above is merely exemplary. Any technique for linking the trigger data and graphic data so that the trigger data will be retrieved when the graphic data is retrieved and used can be employed. Merely by way of example, the graphic data and trigger data files may be stored as part of a common directory in a file directory structure. Alternatively, information such as a table linking graphic data files and trigger data files may be stored as a separate file or other compilation of information. Although the memory 52 storing trigger data and graphic data files has been described above as conventional memory, any form of storage may be employed. Thus, it is not essential to provide both the trigger data and the graphic data files in the same physical device or even in the same physical location. For example, the trigger data files may reside on any computer or storage device accessible to the computer of the character generator as, for example, on a server accessible through the Internet.

Although the various elements of the system have been described above using discrete functional blocks for clarity, it should be appreciated that these functions can be merged or separated as desired. Merely by way of example, the functions of the gateway computer can be integrated with the functions of the computer 50 in the character generator itself, provided that this computer is equipped with the appropriate GPI interface or other interface for receiving condition data from the switch.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. Apparatus for encoding an output video stream with interactive triggers comprising:
   (a) a plurality of graphic sources operative to supply a plurality of graphics;
   (b) a video switch having an output connection, said video switch being connected to said graphic sources, said video switch being adapted to select a set of one or more of said graphic sources and operatively connect the set of selected graphic sources to said output connection so that the graphics supplied by the one or more graphic sources in said set will be included in an output video stream at said output connection and will be visible when said output video stream is viewed in a video receiver;
   (c) an inserter having a trigger input, said inserter being connected to said video switch so that an interactive trigger supplied to said trigger input will be inserted in said output video stream;
   (d) a trigger source operative to supply data specifying interactive triggers such that each said trigger is associated with one or more of said graphic sources;
   (e) a gateway circuit connected to said video switch so that said gateway circuit receives information from said video switch representing the identify of the set of graphic sources connected to said output channel, said gateway circuit being operative to automatically supply one or more triggers associated with the one or more graphic sources in said set to the trigger input of the inserter.

2. Apparatus as claimed in claim 1 wherein said plurality of graphic sources include one or more memories holding one or more specification units, at least some of said specification units including graphic data specifying one or more graphics and trigger data specifying one or more triggers, at least one of said graphic sources being operative to retrieve one of said specification units and supply the graphics specified by the retrieved specification unit, and to supply the data specifying the one or more triggers specified by the retrieved specification unit, whereby said graphic sources also serve as said trigger source.

3. Apparatus as claimed in claim 2 wherein said at least one of said graphic sources is operative to supply the trigger data specified by a specification unit while such graphic source is supplying the graphics specified by the same specification unit.

4. Apparatus as claimed in claim 2 wherein the graphic data in at least some of said specification units includes coordinate data specifying location of a graphic within a displayed image and wherein the trigger data in at least some of said specification units includes (i) said coordinate data or (ii) an instruction to incorporate said coordinate data in a trigger.

5. Apparatus as claimed in claim 4 wherein the trigger data in at least some of said specification units includes an instruction to incorporate said coordinate data in a trigger, and wherein said gateway circuit is operative to incorporate the coordinate data in a trigger responsive to such instruction.

6. Apparatus as claimed in claim 2 wherein the trigger data in at least some of said specification units includes an instruction to incorporate data from the graphic data in such specification unit and wherein said gateway circuit is operative to incorporate such data in a trigger responsive to such instruction.

7. Apparatus as claimed in claim 2 wherein each said specification unit is a single data file.

8. Apparatus as claimed in claim 2 wherein the graphic data in at least some of said specification units includes text data, and wherein each said graphic source is operative to display a graphic including text corresponding to the text data.

9. Apparatus as claimed in claim 1 wherein said video switch is manually operable to select graphic sources for inclusion in said set, and to vary such selection, as commanded by a human operator.

10. Apparatus as claimed in claim 1 wherein said graphic sources include a source of live video.

11. A method of providing a video output stream with interactive triggers comprising:
(a) providing a plurality of graphics through a plurality of graphic sources;
(b) providing trigger data specifying a plurality of interactive triggers so that the data specifying each such trigger is associated with one of said graphic sources and thereby associated with the graphic supplied by that source;
(c) selecting a set including one or more of said graphic sources and incorporating the graphics supplied by the selected graphic sources in an output video stream;
(d) responsive to the selection of step (c), automatically selecting from the trigger data a set of selected trigger data associated with the set of graphic sources; and
(e) inserting the triggers specified by said selected trigger data in said output video stream so that the trigger associated with each graphic is inserted in the output video stream in a predetermined time relationship with that graphic.

12. A method as claimed in claim 11 further comprising varying the set of graphic sources in step (c), said set of selected trigger data in step (d) varying in response to said varying set of graphic sources.

13. A method as claimed in claim 12 wherein said step of providing a plurality of graphics includes providing live video.

14. A method as claimed in claim 12 wherein said step of varying the set of graphic sources in step (c) includes manually controlling the selection of graphic sources.

15. A method as claimed in claim 11 wherein said steps of providing graphics and trigger data include operating at least one graphic source to retrieve a specification unit incorporating graphic data specifying one or more graphics and trigger data specifying one or more triggers, to supply the graphic specified in the specification unit and to supply the trigger data incorporated in the specification unit.

16. A method as claimed in claim 15 wherein said step of operating at least one graphic source includes operating a plurality of graphic sources to retrieve different specification units.

* * * * *